Aug. 4, 1959 G. W. CRAMPTON 2,898,554
DEVIATION OSCILLATOR
Filed Dec. 22, 1955
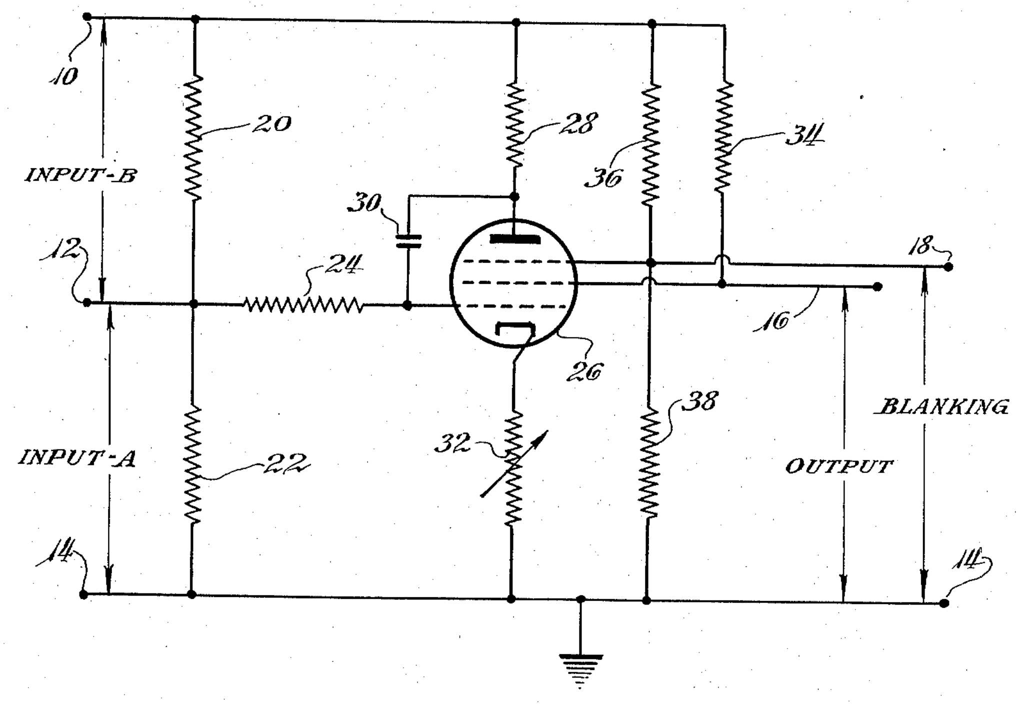
Inventor:
Gale W. Crampton
By Ahlberg, Wupper & Gradolph,
Attorneys.

2,898,554

DEVIATION OSCILLATOR

Gale W. Crampton, Chicago, Ill., assignor to Victor Adding Machine Company, Chicago, Ill., a corporation of Illinois Application December 22, 1955, Serial No. 554,672

2 Claims. (Cl. 331—72)

The present invention relates to electronic circuits and particularly to a novel deviation oscillator suitable for incorporation in electronic systems of wide variety.

One of the objects of my invention is to provide a novel deviation oscillator which has the capability of producing oscillations at a frequency which is a function of more than one input voltage.

Another object is to provide a deviation oscillator which accepts two variable control voltages and which produces oscillations having a frequency which is a function of the two control voltages combined.

Still another object is to provide a circuit having the above characteristics, which will operate with a high order of precision and which can be supplied at low cost.

Yet another object is to provide a circuit having the above characteristics and which in addition has a novel and simple provision for blanking the output whenever desired.

Other objects and advantages will become apparent from the following description of a preferred embodiment of my invention which is illustrated in the single figure of the drawings.

In the drawings:

The figure is a circuit diagram of a deviation oscillator incorporating features of the present invention.

Three input terminals and leads are indicated at 10, 12 and 14, and for convenience in reference a circuit connected between terminals 12 and 14 will be known as "input A," while a second circuit connected between terminals 10 and 12 will be referred to as "input B." The output of the circuit is taken from terminals indicated at 16 and 14, while blanking is accomplished by applying a proper voltage between terminals 18 and 14. In most circuits lead 14 will be grounded and it is so shown even though this is of course not essential.

A resistor 20 is connected between leads 10 and 12 while a second resistor 22 is connected between leads 12 and 14. These two resistors form a voltage divider and have a relative value such that the potential on lead 12 in the specific embodiment illustrated is approximately three to four volts when that at lead 10 is of the order of three hundred volts. The common point of the resistors 20 and 22, that is, the lead 12, is connected through a resistor 24 to the control grid of a pentode indicated at 26. The plate of this pentode is connected through a current limiting resistor 28 to the lead 10. A capacitor 30 is connected between the control grid and the plate of the pentode 26.

The cathode of the pentode 26 is connected through a variable resistor 32 to the lead 14, while the screen of the pentode is connected to the output terminal 16 and also through a resistor 34 to the lead 10. The pentode suppressor is connected to the blanking terminal 18 and also to the midpoint of a voltage divider comprised of a resistor 36 leading to line 10 and a resistor 38 leading to ground.

In the above circuit it is assumed that a variable voltage of the order of 300 volts from some source is applied to input B, while a variable voltage at a value of approximately three to four volts is applied at input A. A suitable value for the resistor 24 in the control grid circuit is 2.2 meg. The capacitor 30 can have a value of 500 mmf., while the current limiting resistor 28 in the plate circuit appropriately has a value between 100K and 470K. The resistor 34 in the screen grid circuit may typically have a value of 47K, while variable resistor 32 in the present instance is assumed to have a total value of approximately 3K.

Resistors 36 and 38 have a relative value such that the suppressor will be at a potential of about five volts above the cathode when the variable resistor 32 is placed somewhere in its midrange position. The pentode 26 may be of the 6AS6 type.

In this circuit the elements form a phantastron with the resistor 24 and the capacitor 30 serving as the RC elements. They may therefore be changed from the values given to shift the basic oscillation frequency. The output frequency of this circuit is equivalent to the input voltage at A plus the input voltage at B plus the RC constant.

Circuit operation is as follows: When the phantastron circuit is first turned on, the plate voltage is equal to the voltage in line 10 (of the order of 300 volts D.C. in this example) and the capacitor 30 is charged by the difference between this potential and that supplied by the voltage divider 20—22. When the resistor 32 is adjusted until the suppressor potential is about five volts higher than the cathode, the tube will start to conduct between the cathode and plate and initiate the portion of the cycle known as the "run-down." During this conducting period the plate voltage is decreasing and the grid voltage is increasing somewhat. The rate of this run-down will of course depend upon the values of capacitor 30 and resistor 24 and the potential across resistor 24.

The run-down is linear (the plate potential decreases as a straight line function of time) and is equal in volts per second to substantially the voltage on line 10 divided by the RC constant.

When the plate voltage has been reduced to the point where it is about equal to the control grid voltage, the tube is cut off and the plate potential rapidly rises to the potential of line 10, meanwhile, recharging the capacitor 30. As soon as the capacitor 30 has been recharged, the cycle repeats.

Inasmuch as the duration of the run-down portion of the cycle in volts per second is a function of the starting plate voltage divided by the RC constant, the frequency of oscillation is a function of the plate voltage, the grid voltage, and the resistance and capacitance in the phantastron circuit. Input A provides a means for varying the grid voltage, while input B provides a means for varying the plate potential. Thus if a variable voltage from say 250 to 300 volts is applied at input B, the output frequency will be a direct function of this voltage so long as the voltage at input A remains constant. Similarly, if the voltage at input B is held constant, the output frequency will be a direct function of the voltage at the input A. If both input A and input B vary, the output frequency will be a function of input A plus input B, both of which are effective to vary the time constant established by resistor 24 and capacitor 30.

During the run-down portion of the cycle, while conduction takes place between the cathode and the plate of the pentode 26, the screen circuit is substantially cut off and the screen voltage will rise toward the line voltage at the lead 10. During the recovery portion of the phantastron cycle, the cathode current is switched to the screen circuit, thereby dropping the screen potential and the potential of the lead 16. The output between leads 16 and 14, therefore, is substantially a square wave at a frequency which is a function of the values of resistor 24 and capacitor 30 as modified by the two voltages at input A and input B.

With this circuit it is possible to connect the output of a variable voltage transducer to input A, under which conditions, if everything else remains fixed, the output frequency between terminals 16 and 14 will be determined by the voltage supplied by the transducer. Thus, for instance, the output of this circuit under these conditions will be an expression of an analogue input in digital terms. This output frequency can be varied by changing the voltage at the input B with the result that input B can be used for modifying the output according to some other external factor. As an example, two analogues can be added by this circuit and the result expressed at the output in digital terms. As another example, supposing that the voltage from the transducer previously mentioned is not a straight line function of the change measured by the transducer. Under these conditions the output would be a digitalization of the voltage received at input A, but would not be a linear function of the quantity change to which the transducer was subjected. This can be corrected by supplying a variable voltage at input B which is a function of the nonlinearity of the transducer. Under these conditions the circuit as a whole will operate so that the quantity change will be reflected as an analogue by the voltage output of the transducer plus some nonlinearity. The voltage change representing the nonlinearity which is introduced at input B causes the output to be a true linear expression in digital terms of the original variable to which the transducer was sensitive. Other uses for this circuit will be apparent, but it should be appreciated that this invention is concerned with the circuit rather than with all of the uses to which it may be put.

As previously mentioned, the run-down cycle of the phantastron will be started when the potential at the suppressor rises to a value of approximately five volts above that at the cathode. Terminal 18 provides a means for varying the voltage at the suppressor and therefore provides an arrangement for cutting off conduction through the pentode 26 so as to blank the output. As an example, the resistor 32 can be adjusted until the tube is cut off because of a lack of sufficient potential difference between the cathode and the suppressor. Then if a positive pulse is introduced by way of the terminal 18, this pulse being of sufficient magnitude to raise the potential of the suppressor to a level more than five volts above the cathode, the run-down cycle will be started. Once having started, the run-down cycle and the recovery cycle will be completed even though the potential at the suppressor is immediately dropped to the original level. This is because the cathode potential immediately drops when conduction starts. In other words, the action is regenerative.

Instead of supplying a single pulse to the lead 18 so as to produce one cycle of operation, it is of course possible to maintain a positive potential at the lead 18 so as to obtain a continuous oscillatory output until the positive potential applied to terminal 18 is removed. Conversely, the variable resistor 32 can be adjusted so that the tube oscillates normally in the manner first described and the output can be cut off momentarily by applying a negative pulse or continuously by supplying a negative potential of long duration to the terminal 18.

From the above description of a preferred embodiment of my invention it will be seen that a circuit constructed as described will serve as an oscillator having an output frequency which is a function of two distinct variable input voltages, and that the output can be blanked by supplying either a negative potential to the lead 18 or by removing a positive potential therefrom, as desired.

It will be appreciated that the specific values given in the above described circuit are for purpose of illustrating a concrete embodiment of the invention, and are not to be considered as limitative. It will be appreciated further that various modifications and changes can be made in this basic circuit while remaining within the scope and spirit of the invention, and that therefore the scope of this invention is to be measured by the scope of the accompanying claims.

Having described my invention, what I claim is new and useful and desire to secure by Letters Patent of the United States is:

1. A deviation oscillator for providing oscillations having a frequency which is a function of the instantaneous values of two variable input direct current voltages comprising: an electron discharge tube of pentode type having a cathode, an anode, a control grid, a screen and a suppressor, circuit means connecting said pentode elements to provide a phantastron oscillator having a linear anode potential run-down characteristic as a portion of each cycle when said suppressor is more positive than said cathode by a certain amount, a first input circuit including a series resistor connected for directly introducing a variable direct current potential at said control grid, a second input circuit including a series resistor directly connected for introducing a second direct current potential at said anode, adjustable means for lowering the potential of said cathode relative to said suppressor to less than said certain amount, circuit means adapted for external connection for applying a positive potential to said suppressor, and an output circuit connected to said screen.

2. A deviation oscillator for providing oscillations having a frequency which is a function of the instantaneous value of two variable input direct current voltages comprising: an electron discharge tube of pentode type having a cathode, an anode, a control grid, a screen and a suppressor, circuit means connecting said pentode elements to provide a phantastron oscillator having a linear anode potential run-down characteristic as a portion of each cycle when said suppressor is more positive than said cathode by a certain amount, a first input circuit including a series resistor connected for directly introducing a variable direct current voltage from a remote source at said control grid, a second input circuit including a series resistor for directly introducing a second variable direct current voltage from a second remote source to said anode, adjustable means for raising the potential of said cathode relative to said suppressor to more than said certain amount, circuit means adapted for external connection for lowering the potential on said suppressor to less than said certain amount, and an output circuit connected to said screen.

References Cited in the file of this patent

UNITED STATES PATENTS 2,552,949 Fleming-Williams ------- May 15, 1951
2,662,178 Levell ---------------- Dec. 8, 1953

FOREIGN PATENTS 156,169 Australia ------------ Apr. 22, 1954